United States Patent
Tonar et al.

(10) Patent No.: US 9,612,500 B2
(45) Date of Patent: Apr. 4, 2017

(54) ELECTRO-OPTIC DEVICE WITH CONDUCTIVE SEAL

(71) Applicant: Gentex Corporation, Zeeland, MI (US)

(72) Inventors: William L. Tonar, Holland, MI (US); Gary J. Dozeman, Zeeland, MI (US); Joel A. Stray, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/850,005

(22) Filed: Sep. 10, 2015

(65) Prior Publication Data

US 2016/0077399 A1 Mar. 17, 2016

Related U.S. Application Data

(60) Provisional application No. 62/049,062, filed on Sep. 11, 2014.

(51) Int. Cl.
*G02F 1/03* (2006.01)
*G02F 1/153* (2006.01)
(Continued)

(52) U.S. Cl.
CPC .............. *G02F 1/161* (2013.01); *B60R 1/12* (2013.01); *G02F 1/1339* (2013.01);
(Continued)

(58) Field of Classification Search
CPC ...... G02F 1/03; G02F 1/1339; G02F 1/13392; G02F 1/13394; G02F 1/13396;
(Continued)

(56) References Cited

U.S. PATENT DOCUMENTS

| 4,050,786 | A | * | 9/1977 | Feldman | ............. | G02F 1/13392 |
| | | | | | | 349/142 |
| 4,148,128 | A | * | 4/1979 | Feldman | ............. | G02F 1/13392 |
| | | | | | | 29/592.1 |
| 4,761,061 | A | | 8/1988 | Nishiyama et al. | | |
| 5,130,831 | A | | 7/1992 | Kohara et al. | | |
| 6,665,107 | B2 | | 12/2003 | Forgette et al. | | |
| 7,064,882 | B2 | | 6/2006 | Tonar et al. | | |
| 7,324,261 | B2 | * | 1/2008 | Tonar | ...................... | C09K 9/02 |
| | | | | | | 359/265 |

(Continued)

FOREIGN PATENT DOCUMENTS

WO 2004031840 A2 4/2004

OTHER PUBLICATIONS

International Searching Authority, Notification of the International Search Report and Written Opinion re: PCT/US2015/049565, Dec. 4, 2015, 8 pages, Moscow, Russia.

*Primary Examiner* — Loha Ben
(74) *Attorney, Agent, or Firm* — Price Heneveld LLP; Bradley D. Johnson (57) ABSTRACT

An electro-optic assembly is provided that includes a first substantially transparent substrate comprising: a first surface, and a second surface. The second surface comprises a first electrically conductive layer and a first isolation area. The assembly further includes a second substrate comprising: a third surface, and a fourth surface. The third surface comprises a second electrically conductive layer. The assembly also includes a primary seal between the second and third surfaces, the seal and the second and third surfaces define a substantially hermetic cavity; and an electro-optic medium at least partially disposed in the cavity. The primary seal comprises a plurality of conductive spacers, the seal disposed in contact with portions of the first and second electrically conductive layers. A substantial portion of the plurality of conductive spacers is in substantial contact with the second and third surfaces.

20 Claims, 2 Drawing Sheets

(51) Int. Cl.
*G02F 1/161* (2006.01)
*G02F 1/1345* (2006.01)
*G02F 1/1339* (2006.01)
*B60R 1/12* (2006.01)
*G02F 1/157* (2006.01)
*B60R 1/08* (2006.01)

(52) U.S. Cl.
CPC ........ *G02F 1/1345* (2013.01); *G02F 1/13392* (2013.01); *B60R 1/088* (2013.01); *B60R 2001/1215* (2013.01); *G02F 1/157* (2013.01); *G02F 1/1533* (2013.01)

(58) Field of Classification Search
CPC ...... G02F 1/1345; G02F 1/1533; G02F 1/157; G02F 1/161; G02F 1/163; B60R 1/08; B60R 1/088; B60R 1/12
USPC ................ 359/237, 238, 245–247, 265–275; 349/16, 35, 142, 153, 155, 189; 438/29, 438/30
See application file for complete search history.

(56) References Cited

U.S. PATENT DOCUMENTS

| | | | |
|---|---|---|---|
| 7,372,611 B2 | 5/2008 | Tonar et al. | |
| 7,379,225 B2 | 5/2008 | Tonar et al. | |
| 7,570,413 B2 | 8/2009 | Tonar et al. | |
| 7,602,542 B2 | 10/2009 | Tonar et al. | |
| 7,719,750 B2 | 5/2010 | Tonar et al. | |
| 8,004,741 B2 | 8/2011 | Tonar et al. | |
| 8,169,684 B2 * | 5/2012 | Bugno | B60R 1/088 359/265 |
| 8,559,092 B2 * | 10/2013 | Bugno | B60R 1/088 359/265 |
| 8,638,488 B2 | 1/2014 | Tonar et al. | |
| 9,041,998 B2 | 5/2015 | Tonar et al. | |
| 2004/0218247 A1 | 11/2004 | Tonar et al. | |
| 2007/0002262 A1 | 1/2007 | Kawabe | |
| 2016/0075284 A1 * | 3/2016 | Green | G02F 1/1339 359/245 |

* cited by examiner

ELECTRO-OPTIC DEVICE WITH CONDUCTIVE SEAL

CROSS REFERENCE TO RELATED APPLICATIONS

The present application claims the benefit of priority under 35 U.S.C. §119(e) from U.S. Provisional Patent Application No. 62/049,062 filed on Sep. 11, 2014, and titled "ELECTRO-OPTIC DEVICE WITH CONDUCTIVE SEAL," the content of which is relied upon and incorporated herein by reference in its entirety.

FIELD

This disclosure generally relates to electro-optic devices that can be employed in rearview display devices, variable transmission windows and other applications.

BACKGROUND

Electro-optic assemblies are being used in various vehicular and building applications, e.g., within rearview display devices and variable transmissive windows. Use of these assemblies in various applications can be limited by cost, aesthetic and functional considerations. Accordingly, new electro-optic assembly designs, configurations and assemblies, along with methods of making them, are needed particularly in view of reducing material and processing costs, improving aesthetics and/or enhancing functionality.

BRIEF SUMMARY

According to one aspect of the disclosure, an electro-optic assembly is provided that includes a first substantially transparent substrate comprising: a first surface, and a second surface. The second surface comprises a first electrically conductive layer and a first isolation area separating portions of the first electrically conductive layer. The assembly further includes a second substrate comprising: a third surface, and a fourth surface. The third surface comprises a second electrically conductive layer The assembly also includes a primary seal between the second and third surfaces, the seal and the second and third surfaces define a substantially hermetic cavity; and an electro-optic medium at least partially disposed in the cavity. The primary seal comprises a plurality of conductive spacers, the seal disposed in contact with portions of the first and second electrically conductive layers. In addition, a substantial portion of the plurality of conductive spacers is in substantial contact with the second and third surfaces.

According to an aspect of the disclosure, an electro-optic assembly is provided that includes a first substantially transparent substrate comprising: a first surface, and a second surface, the second surface comprises a first electrically conductive layer and a first isolation area separating portions of the first electrically conductive layer. The assembly further includes a second substrate comprising: a third surface, and a fourth surface, the third surface comprises a second electrically conductive layer. The assembly also includes a primary seal between the second and third surfaces, the seal and the second and third surfaces define a substantially hermetic cavity; and an electro-optic medium at least partially disposed in the cavity. The primary seal comprises a plurality of conductive spacers, the seal disposed in contact with portions of the first and second electrically conductive layers. In addition, the primary seal is configured such that a seal resistance between the portions of the first and second electrically conductive layers in contact with the primary seal is less than the cavity resistance through the cavity and between the portions of the first and second electrically conductive layers not in contact with the primary seal.

According to an additional aspect of the disclosure, an electro-optic assembly is provided that includes a first substantially transparent substrate comprising: a first surface, and a second surface, the second surface comprises a first electrically conductive layer and a first isolation area separating portions of the first electrically conductive layer. The assembly also includes a second substrate comprising: a third surface, and a fourth surface, the third surface comprises a second electrically conductive layer. The assembly further includes a primary seal between the second and third surfaces, the seal and the second and third surfaces define a substantially hermetic cavity; and an electro-optic medium at least partially disposed in the cavity. The primary seal comprises a plurality of conductive particles, the seal disposed in contact with portions of the first and second electrically conductive layers; and the conductive particles comprise magnetic material.

These and other features, advantages, and objects of the present invention will be further understood and appreciated by those skilled in the art by reference to the following specification, claims, and appended drawings.

BRIEF DESCRIPTION OF THE DRAWINGS

The disclosure will become more fully understood from the detailed description and the accompanying drawings, wherein.

DETAILED DESCRIPTION

The present illustrated embodiments reside primarily in combinations of various apparatus components, and methods of making them, related to an electro-optic assembly with a conductive seal. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
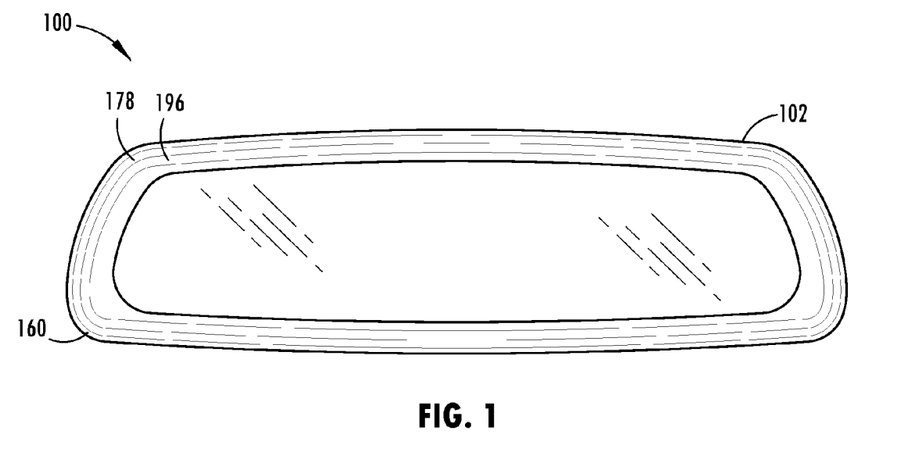
FIG. 1 is a surface plan view of an electro-optic assembly, in accordance with one aspect of the disclosure.
Figure 2:
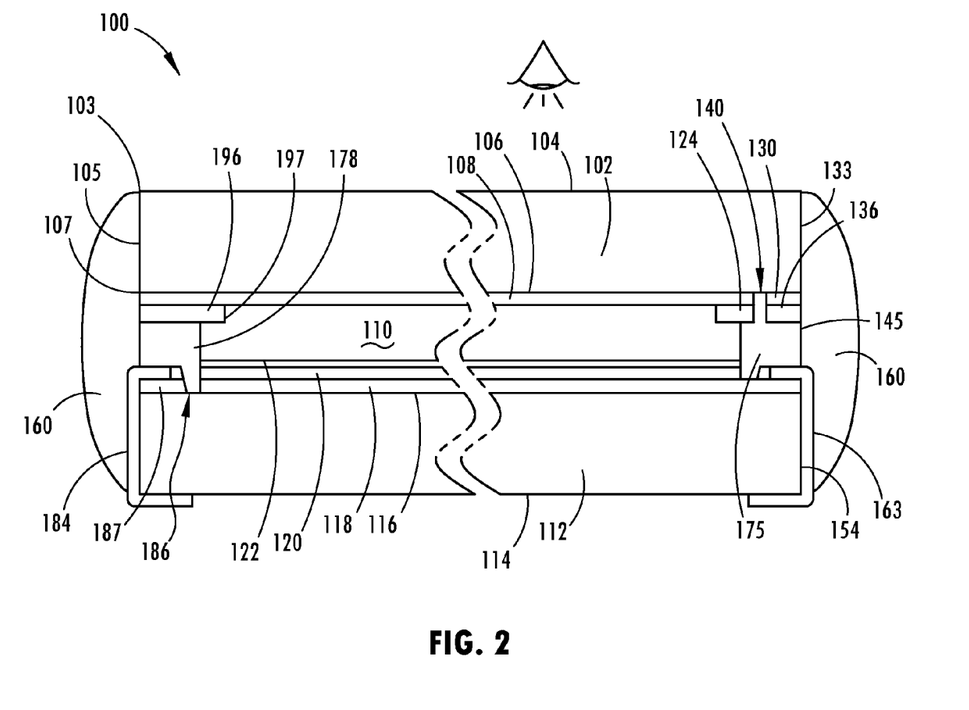
FIG. 2 is a cross-sectional view of an electro-optic assembly, in accordance with an aspect of the disclosure.

In reference to FIGS. 1-2, an electro-optic assembly is generally shown at referenced identifier 100. FIG. 1 depicts an electro-optic assembly 100 as viewed toward a first substrate 102 in a plan view with a spectral filter 196 positioned between the viewer and a primary seal 178. The primary seal 178, as used herein in this disclosure, may include a plug (not shown) that is employed after the electro-optic medium 110 is filled within the assembly 100. Further, a perimeter material 160 is applied to the edge of the assembly 100, outboard from the primary seal 178. It should be understood that the primary seal 178 may be applied by means commonly used in the LCD industry such as by silk-screening or dispensing. Using these techniques, the primary seal 178 may be applied to an individually cut-to-shape substrate or it can be applied as multiple primary seal shapes on a large substrate. In certain aspects, the large substrate with multiple primary seals applied may then be laminated to another large substrate and the individual mirror shapes can be cut out of the laminate after at least partially curing the primary seal 178. Electro-optic devices, such as assemblies 100, can be made using a similar process. All coatings such as the transparent conductors, reflectors, spectral filters and in the case of solid state electro-optic devices the electro-optic layer or layers may be applied to a large substrate and patterned if necessary. The coatings can be patterned using a number of techniques such as by applying the coatings through a mask, by selectively applying a patterned soluble layer under the coating and removing it and the coating on top of it after coating applicant, laser ablation or etching. These patterns can contain registration marks or targets that can be used to accurately align or position the substrates throughout the manufacturing process. This is usually done optically for instance with a vision system using pattern recognition technology. The registration marks or targets may also be applied to the glass directly such as by sand blasting, chemical etching, laser or diamond scribing if desired.

Non-conductive and conductive spacing media, including the conductive spacers (e.g., conductive spacers 210 depicted in FIG. 3A) disclosed herein, for controlling the spacing between the laminated substrates may be placed into the primary seal 178 (e.g., before or after the seal material is dispensed within the assembly 100 and cured) or applied to a substrate prior to lamination. The spacing media or means may be applied to areas of the laminate that will be cut away from the finished, mirror assemblies. The laminated arrays can be cut to shape before or after filling with electro-optic material and plugging the fill port if the devices are solution phase electro-optic mirror elements.

FIG. 2 depicts an electro-optic assembly 100, which is an enlarged view of the assembly depicted in FIG. 1 to provide greater detail. Assembly 100 comprises a first substrate 102 having a first surface 104 and a second surface 106. A first conductive portion 108 and a second conductive portion 130 applied to the second surface 106 are substantially electrically insulated from one another via a first isolation area 140. As can be seen, in at least one embodiment the isolation area can be located such that it is on top of the conductive portions 108 and 118 and is electrically isolating, thus preventing conductive portions 108, 118 from being in electrical contact with each other. As such, the first isolation area 140 may be thus defined without removing portions of electrode materials on the second and third surfaces 106, 116. Spectral filter 196, and portions 124, 136, can also be electrically insulating materials or include electrically insulating materials to electrically isolate conductive portion 108 from conductive portion 118.

In FIG. 2, a portion of the first isolation area 140 is shown to be extending parallel within a portion of the primary seal 175 located near the center thereof. It should be understood that the primary seal 175, as used herein within this disclosure, may also include a plug (not shown) that is introduced after the electro-optic medium 110 has been introduced within assembly 100. It should be understood that this portion of the isolation area 140 may lie such that a viewer would not readily perceive a line within the spectral filter 196; for example, a portion of the isolation area 140 may be substantially aligned with an inboard edge of the spectral filter portion 124. It should be understood that when any portion of the isolation area 140 is located inboard of the primary seal 175, a discontinuity in the electro-optic material coloring and, or, clearing may be observed. This operational characteristic may be manipulated to derive a subjectively visually appealing element. Isolation area 140 may also be of a dimension smaller than the eye can readily see, e.g., less than 10 µm wide.

Still referring to FIG. 2, the electro-optic assembly 100 is depicted to comprise a second substrate 112 having a third surface 116 and a fourth surface 114. It should be noted that the first substrate 102 may be larger than the second substrate 112 to create an offset along at least a portion of the perimeter of the assembly (or vice versa). Third and fourth conductive electrode portions 118, 187, respectively, are shown proximate the third surface 116 substantially electrically insulated via second isolation area 186. A portion of the second isolation area 186 is shown to be extending parallel within a portion of the primary seal 178 located near the center thereof. It should be understood that this portion of the isolation area 186 may lie such that a viewer would not readily perceive a line within the spectral filter material; for example, a portion of the second isolation area 186 may be substantially aligned with an inboard edge 197 of the spectral filter 196. In some implementations, the isolation area 186 may extend to the outbound edge of substrate 112 in such a way as to eliminate electrode portion 187. As further shown in FIG. 2, a reflective material 120 may be applied between an optional overcoat 122 and the third conductive portion 118.

Figure 3A:
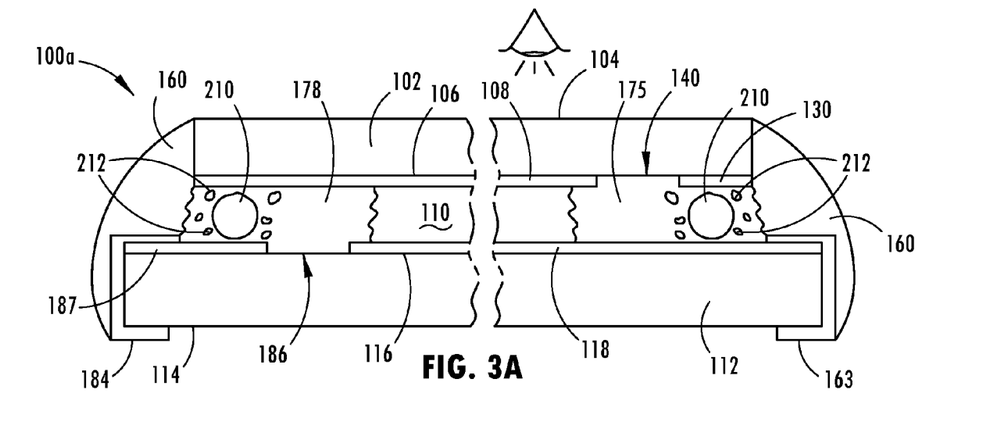
FIG. 3A is an enlarged, cross-sectional view of the electro-optic assembly depicted in FIG. 2, in accordance with one aspect of the disclosure.

With further reference to FIG. 2, the first isolation area 140 cooperates with a portion of the primary seal 175 to define the second conductive electrode portion 130 and the second spectral filter material portion 136, each substantially electrically insulated from the first conductive electrode portion 108 and the first spectral filter portion 124. This configuration allows for placement of an electrically conductive material (e.g., conductive spacers 210, 212 as shown in FIG. 3A) within the primary seal 175 such that the first electrical clip 163, which is in contact with the primary seal 175, is further in electrical communication with the third conductive electrode portion 118, the second conductive electrode portion 130, the reflective material 120, the optional overcoat 122 and the electro-optic medium 110. Preferably, the material, or composition of materials, forming the third conductive electrode portion 118, the first electrical clip 163 and the electrically conductive material within the seal 175 are chosen to promote durable electrical communication between the clip 163 and the materials leading to the electro-optic medium 110.

Referring again to FIG. 2, the second isolation area 186 cooperates with a portion of the primary seal 178 to define the fourth conductive electrode portion 187 (if present) that is substantially electrically insulated from the third conductive electrode portion 118, the reflective layer 120, the optional overcoat 122 and the electro-optic medium 110. This configuration allows for placement of an electrically conductive material (e.g., conductive spacers 210, 212 as shown in FIG. 3A) within the primary seal 178 such that second electrical clip 184 is in electrical communication with the first spectral filter portion 124, the first conductive electrode portion 108 and the electro-optic medium 110. Preferably, the material, or composition of materials, forming the first conductive portion 108, the first electrical clip 184, the spectral filter 196 and the electrically conductive material within the seal 178 are chosen to promote durable electrical communication between the clip 184 and the materials leading to the electro-optic medium 110.

In certain aspects of the electro-optic assembly 100, a perimeter material 160 is disposed on one or more edges of the substrates 102, 112 and/or electrical clips 163, 184. The perimeter material 160, when present in the electro-optic assembly 100, is selected such that the resulting visible edge surfaces of the substrates are visually appealing and such that good adhesion is obtained at the edges of the substrates, e.g., interfaces 133, 145, and 154. It should also be understood that at least a portion of the first substrate 102 in the areas proximate its corners, e.g., first corner 103, the edge 105, the second corner 107 and combinations thereof, may be treated to smooth protrusions and depressions noticeable to a viewer by substrate etching, polishing or the like.

Figure 3B:
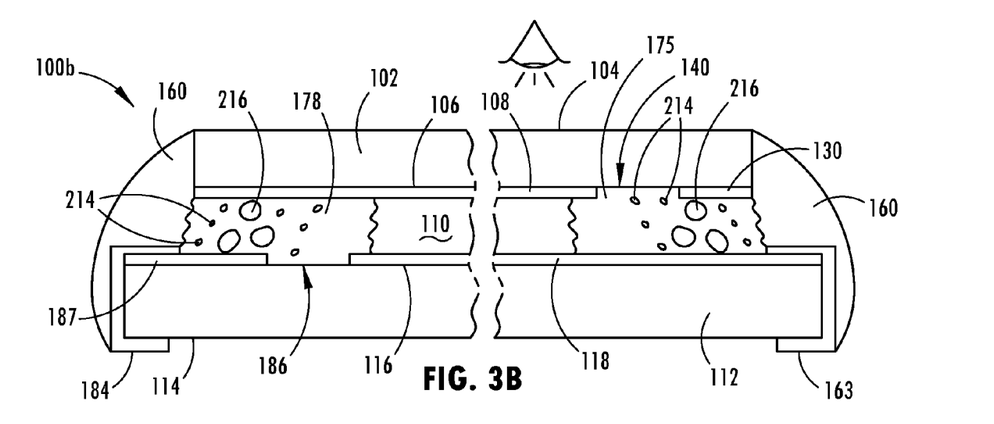
FIG. 3B is an enlarged, cross-sectional view of the electro-optic assembly depicted in FIG. 2, in accordance with another aspect of the disclosure.
Figure 3C:
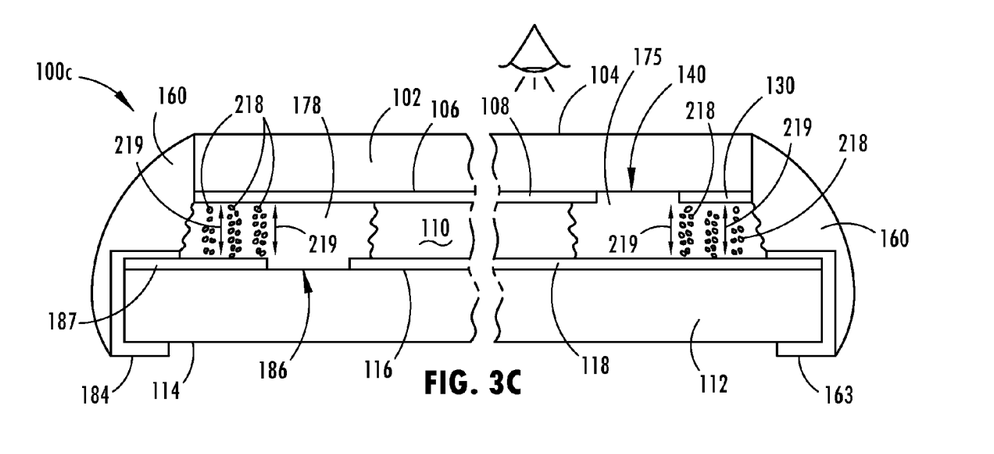
FIG. 3C is an enlarged, cross-sectional view of the electro-optic assembly depicted in FIG. 2, in accordance with a further aspect of the disclosure.

Referring to FIGS. 3A-3C, primary seal portions of the electro-optic assembly 100 shown in FIGS. 1 and 2 are shown in an enlarged, cross-sectional format to provide additional detail associated with salient features of the various, exemplary embodiments of this disclosure. More specifically, electro-optic assemblies 100*a*, 100*b*, and 100*c* are depicted in FIGS. 3A-3C, respectively, according to various exemplary aspects of the disclosure related to configurations of the primary seals 175 and 178. In each of these configurations, portions of the primary seals 175 and 178 are configured to be substantially electrically conductive, particularly in the Z-axis (thickness direction) within the assembly 100. In aspects of the assembly 100 employing conductive spacers or particles (e.g., conductive spacers and particles 210, 212, 214, 216 and 218) within the primary seals 175, 178, the conductive spacers or particles can be equally spaced at the perimeter of the substrates, substantially equally spaced, randomly distributed or semi-randomly distributed.

Advantageously, each of these configurations of electro-optic assembly 100 is associated with an electro-optic assembly design that does not require conductive epoxies or the like for making electrical connections between the electrodes of the assemblies (e.g., electrode portions 108, 118), electrical contacts (e.g., clips 163 and 184, busses and the like) and the electro-optic medium 110. Cost savings are realized as conductive epoxies (and typical alternatives) often contain expensive precious metals, including gold or silver. An additional advantage is that the integration of conductive material into the primary seals 175, 178 provides the electro-optic assembly designs of this disclosure with primary seals that are more outboard relative to the seals in conventional designs. As a result, the electro-optic assemblies of this disclosure can have reduced-width seal regions that can be masked or otherwise obscured from the viewer to present a clean display surface (e.g., via the use of spectral filters, overlapping bezel configurations, etc.).

Referring to FIG. 3A, an electro-optic assembly 100*a* is provided that includes a first substantially transparent substrate 102 comprising: a first surface 104, and a second surface 106. The second surface 106 comprises a first electrically conductive layer 108, 130 and a first isolation area 140 separating portions of the first electrically conductive layer 108 and 130. The assembly 100 further includes a second substrate 112 comprising: a third surface 116, and a fourth surface 114. The third surface 116 comprises a second electrically conductive layer 118, 187 and a second isolation area 186 separating portions of the second electrically conductive layer 118 and 187 (if present). Substrate 112 can be made substantially transparent when the assembly 100 is employed in a window application or other application requiring high optical transmissivity through the entire assembly. The assembly 100 also includes a primary seal 175 and 178 between the second and third surfaces, 106, 116, respectively, the seals 175, 178 and the second and third surfaces define a substantially hermetic cavity; and an electro-optic medium 110 at least partially disposed in the cavity. The primary seals 175, 178 comprise a plurality of conductive spacers 210, 212, the seals 175, 178 disposed in contact with portions of the first and second electrically conductive layers—e.g., conductive portions 187 and 108 are in contact with primary seal 178 and conductive portions 118 and 130 are in contact with primary seal 175. In addition, a substantial portion of the plurality of conductive spacers 210, 212 is in substantial contact with the second and third surfaces 106, 116, respectively. As depicted in FIG. 3A, the conductive spacers 210, 212 can provide enhanced electrical conductivity through the seals 175, 178 in the axial direction between second and third surfaces 106, 116, respectively.

To afford substantial electrical conductivity between the electrodes and electrode portions, at least portions of the primary seals 175 and 178 comprise a plurality of conductive spacers, e.g., spacers 210, 212. In some aspects, the plurality of spacers 210, 212 includes a mixture of soft and hard spacers. The spacers 210 can be configured to be larger than the spacers 212 in terms of their average radius. Preferably, the spacers 210 span a substantial portion of the cell gap (e.g., the cavity containing the electro-optic medium 110) between the substrates 102 and 112. According to some implementations, the conductive spacers 210 and 212 comprise a mixture of ceramic, polymeric and/or elastomeric beads. The conductive spacers 210, 212 can include conductive particles (e.g., graphite or silver particles or flakes, or other highly conductive particles) and/or conductive polymeric material. In some implementations, the conductive spacers 210, 212 can be beads, particles or the like comprising a core of non-conductive material and a clad, coating, layer or stack of comprising conductive materials. Further, the conductive spacers 210, 212 can comprise various shapes including but not limited to round, oval, triangular, cylindrical, square, cuboid and/or irregular shapes. The spacers 210, 212 can also comprise beads, particles, spacers and other similar shapes. Further, some implementations of the assembly 100 can employ conductive spacers 210, 212 that are semi-conductive in the sense that they possess substantially higher electrical conductivity in the Z-axis direction (i.e., thickness direction) compared to other directions.

Referring again to FIG. 3A, embodiments of the electro-optic assembly 100a require control of the location of the conductive spacers 210, 212 within the primary seals 175, 178. In particular, the primary seals 175 and 178 can extend into the isolation areas 140 and 186, respectively. The plurality of conductive spacers 210, 212 within these seals 175, 178 are located such that the spacers 210, 212 are adjacent or proximate to these areas, in an outboard direction toward the outer edges of the substrates 102, 112 (see, e.g., toward interfaces 105, 133 shown in FIG. 2). As such, the conductive spacers 210, 212 do not provide an electrical path between electrode portions 118 and 187 (if present), and portions 108 and 130, that can lead to a short circuit and/or excessive segregation of the electro-optic medium 110. Nevertheless, the shape, density and size of the spacers 210, 212 can be configured to ensure positional control within the seals 175 and 178 during manufacturing operations. Often the seals 175 and 178 comprise a polymeric material that can flow during manufacturing and processing. As such, the spacers 210, 212 can snag or otherwise be fixed proximate to the isolation areas 140 and 186 as the substrates are laminated, pressed or otherwise brought together and the matrix material of the seals 175 and 178 flows in lateral directions toward and away from the electro-optic medium 110.

Advantageously, the electro-optic assembly 100a (see FIG. 3A) can be configured to ensure electrical contact between overlapping electrode portions 187 and 108, along with overlapping electrode portions 130 and 118, while at the same time accommodating variability in the cell gap (e.g., the cavity containing the electro-optic medium 110). In certain embodiments, the dissimilar sizes of the spacers 210, 212 ensure that variability in the cell gap does not compromise the electrical contact between electrode portions 130 and 118, along with electrode portions 187 and 108. In one such implementation, the spacers 210 are configured to be larger in size and softer than the spacers 212. More generally, the ability of the assembly 100a to accommodate cell gap variability can be manifested in less cell gap spacing control during processing, resulting in lower manufacturing costs. A preferred combination to accurately control the cell gap spacing is to use a combination of soft and hard spacers for spacers 210, 212. The soft spacers (e.g., as spacers 210) being larger than the cell gap spacing and at least some of the hard spacers (e.g., spacers 212) being approximately equal to the desired cell gap spacing.

Referring now to FIG. 3B, an electro-optic assembly 100b is provided according to an embodiment that includes a first substantially transparent substrate 102 comprising: a first surface 104, and a second surface 106, the second surface 106 comprises a first electrically conductive layer 108, 130 and a first isolation area 140 separating portions of the first electrically conductive layer 108 and 130. The assembly 100b further includes a second substrate 112 comprising: a third surface 116, and a fourth surface 114, the third surface 116 comprises a second electrically conductive layer 187 (if present), 118 and a second isolation area 186 separating portions of the second electrically conductive layer 187 and 118. The assembly 100b also includes primary seals 175, 178 between the second and third surfaces, 106 and 116, respectively, the seals 175, 178 and the second and third surfaces 106 and 116, respectively, define a substantially hermetic cavity; and an electro-optic medium 110 at least partially disposed in the cavity. The primary seals 175 and 178 comprise a plurality of conductive spacers 214 and 216, the seals 175, 178 disposed in contact with portions of the first and second electrically conductive layers 118 and 130, and 187 and 108, respectively. In addition, the primary seals 175, 178 are configured such that a seal electrical resistance between the portions of the first and second electrically conductive layers 118 and 130, or 187 or 108, respectively, in contact with the primary seals 175 and 178 is less than the cavity resistance through the cavity and between the portions of the first and second electrically conductive layers not in contact with the primary seals (e.g., the electrical resistance between 108, 130 and 110; the electrical resistance between 187, 118 and 110). In some aspects, the seal electrical resistance is lower than the electrical resistance between the electrical clips 184 and 163 and the fourth surface 114 of the second substrate 112.

The conductive spacers 214, 216 employed in the electro-optic assembly 100b are comparable to the conductive spacers 210, 212 employed in the assembly 100a depicted in FIG. 3A. As shown in FIG. 3B, the spacers 214, 216 are generally smaller in size than the spacers 210, 212; consequently, the spacers 214, 216 can be incorporated within the primary seals 175 and 178 at higher volume fractions. Preferably, the conductive spacers 214, 216 are sized to be no greater than ⅒ the size of the cell gap between the substrates 102 and 112. In some aspects, the plurality of conductive spacers 214, 216 can comprise a mixture of conductive spacers 216 and conductive particles 214, and the average diameter of the spacers 216 is larger than the average diameter of the conductive particles 214. Further, it should be understood that the composition, shapes and construction of the conductive spacers 214, 216 employed in the assembly 100b are otherwise the same or similar to the spacers 210, 212 employed in the assembly 100a.

In some aspects of the electro-optic assembly 100b depicted in FIG. 3B, however, the conductive spacers 214, 216 are randomly distributed with the primary seals 175, 178. It can be important to control the location of the primary seal 178 with regard to the electrically conductive layers to ensure that the electrical resistance between the electrically conductive layers 187 and 118 remains sufficiently high to avoid a short circuit across the electro-optic medium 110. Similarly, it can be important to control the location of the primary seal 175 with regard to the electrically conductive layers to ensure that the electrical resistance between the electrically conductive layers 108 and 130 remains sufficiently high to avoid a short circuit across the electro-optic medium 110. One advantage of the assembly 100b is that the small size of the conductive spacers 214, 216 relative to the cell gap between the substrates 102, 112 ensures that the size of the spacers does not need to be matched or otherwise configured to accommodate the variability in cell gap spacing that may occur in manufacturing over high volume production of assemblies 100b. The electrical resistance between seal portions 178 and 175 can be further increased by positioning one or more fill ports between seal portions 178 and 175 that are filled with a substantially non-conductive fill port plug material.

Another advantage of the assembly 100b depicted in FIG. 3B is that the homogenous or substantially homogenous distribution of the conductive spacers 214, 216 in the primary seal region can result in primary seal regions that are smaller than those employed in conventional electro-optic assemblies. The volume fraction and sizes of the spacers can be controlled to ensure enough electrical conductivity in the z-direction between overlapping electrode portions 187 and 108, along with overlapping electrode portions 130 and 118, while at the same time ensuring that the conductivity is not so high as to result in shorting across the cell gap (e.g., containing the electro-optic medium 110).

By employing the conductive material (e.g., spacers 214, 216) within the primary seal regions, there is no need for a separate conductive epoxy and non-conductive epoxy regions. As such, the overall seal width is reduced with the assembly 100b, leading to lower material costs and/or more design flexibility for the assembly 100b (e.g., an improved display surface requiring less surface area of the seal region to mask from the vantage point of a viewer).

Referring now to FIG. 3C, an electro-optic assembly 100c is provided that includes a first substantially transparent substrate 102 comprising: a first surface 104, and a second surface 106, the second surface 106 comprises a first electrically conductive layer 108, 130 and a first isolation area 140 separating portions of the first electrically conductive layer 108 and 130. The assembly 100c also includes a second substrate 112 comprising: a third surface 116, and a fourth surface 114, the third surface 116 comprises a second electrically conductive layer 187 (if present), 118 and a second isolation area 186 separating portions of the second electrically conductive layer 187 and 118. The assembly 100c further includes primary seals 175, 178 between the second and third surfaces, 106 and 116, respectively, the seals 175, 178 and the second and third surfaces, 106 and 116, respectively, define a substantially hermetic cavity. Further, an electro-optic medium 110 is at least partially disposed in the cavity. The primary seals 175, 178 comprise a plurality of conductive particles 218, the seals 175, 178 disposed in contact with portions of the first and second electrically conductive layers 187 and 108, and 118 and 130. Further, the conductive particles 218 comprise magnetic material.

With regard to the electro-optic assembly 100c depicted in FIG. 3C, the conductive particles 218 situated within the primary seals 175 and 178 are magnetic, facilitating their arrangement within the primary seals for the purpose of reducing electrical resistance between the first and second electrically conductive layers—i.e., between 187 and 108, and between 118 and 130. For example, primary seals 175 and 178 can comprise a polymeric matrix that can flow during processing and lamination of the assembly 100c (e.g., a partially-cured thermoset polymeric material). Before the matrix of the seals 175 and 178 are fully cured, a magnetic field such as that generated by magnets can be placed near or on the substrates 102 and 112 in proximity to the seals 175 and 178 for the purpose of generally arranging the conductive particles 218 in an axial direction 219 within the cell gap between the substrates. Once the particles 218 are so arranged, the matrix material employed within the primary seals 175 and 178 can be fully cured, thus locking in the location of the conductive particles 218 within the seals 175, 178.

In aspects of the electro-optic assembly 100c depicted in FIG. 3C, it can be important to control the viscosity of the matrix materials employed in the seals 175, 178 to ensure that the particles 218 remain suspended in place after the magnetic field has been removed. Adhesion, adsorption and surface energy considerations between the particles 218 and the matrix employed in the seals 175, 178 can also play a role. In some implementations, the particles 218 can be suspended in the matrix of the seals 175, 178 by applying a voltage across the electrodes and resistance welding the particles together. Overall, the net result of incorporating the conductive particles 218 into the seals 175, 178 according to the assembly 100c configuration is that the seals 175 and 178 will have substantially low electrical resistance in the axial direction 219, while being substantially non-conductive in directions normal to the axial direction 219. Multiple conductive zones in the seal separated by insulating zones can be achieved by selectively applying a magnetic field in multiple locations in the seal.

One apparent advantage of the electro-optic assemblies 100c is that the location of the conductive particles 218 within the primary seals 175, 178 can be well-controlled and adjusted during manufacturing to achieve desired electrical resistance levels in the cell gap between the substrates 102, 112. As the location of the conductive particles 218 can be well-controlled within the seals, it is possible to more efficiently utilize the conductive material within the primary seals 175, 178 compared to other configurations (e.g., electro-optic assembly configurations that utilize conductive epoxy containing precious metals in addition to a non-conductive primary seal region), resulting in lower material costs. The additional control over the location of the conductive material in the primary seals 175, 178 afforded by the assemblies 100c can facilitate seals 175, 178 with narrower widths that are generally only limited by hermeticity requirements of the cavity that contains the electro-optic medium 110. These smaller seals 175, 178 within the assemblies 100c require smaller spectral filters, bezels or other masking materials to hide the seals 175, 178 from view.

The conductive particles 218 employed in the assemblies 100b depicted in FIG. 3C can comprise various magnetic and ferromagnetic materials. In some aspects, the conductive particles can include any one or more of the following magnetic elements or compounds: Co, Fe, $Fe_2O_3$, FeO $Fe_2O_3$, NiO $Fe_2O_3$, $CuOFe_2O_3$, $MgOFe_2O_3$, MnBi, Ni, MnSb, MnO $Fe_2O_3$, $Y_3Fe_5O_{12}$, $CrO_2$, MnAs, Gd, Dy and EuO. Further, conductive particles 218 can comprise various conductive materials including but not limited to Au, Ag, Pd, Pt, or Pt-group metals such as Rh, Ru, Ir, Os, Cu, Sn and/or C. In some exemplary implementations, the conductive particles 218 can comprise Ag-plated Ni particles, Au-plated Fe particles, Rh-plated Co particles and other combinations thereof. Further, conductive particles 218 that include magnetic elements or compounds can also be coated or plated with carbon or a conductive polymer. One purpose of coating or plating these particles is to help stabilize and/or lower the electrical resistance of the electrically conductive zones.

It should be appreciated by those skilled in the art that the electro-optic assemblies 100, 100a, 100b, and 100c can have additional or alternative advantages. It should further be appreciated by those skilled in the art that the above-described components can be combined in additional or alternative ways not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:
1. An electro-optic assembly, comprising:
a first substantially transparent substrate comprising:
   a first surface, and
   a second surface,
   wherein the second surface comprises a first electrically conductive layer and a first isolation area separating portions of the first electrically conductive layer;

a second substrate comprising:
    a third surface, and
    a fourth surface,
        wherein the third surface comprises a second electrically conductive layer and a second isolation area;
a primary seal between the second and third surfaces, wherein the seal and the second and third surfaces define a substantially hermetic cavity; and
an electro-optic medium at least partially disposed in the cavity,
wherein the primary seal comprises a plurality of conductive spacers, the seal disposed in contact with portions of the first and second electrically conductive layers, and
further wherein a substantial portion of the plurality of conductive spacers is in substantial contact with the second and third surfaces.

2. The electro-optic assembly of claim 1, wherein the conductive spacers comprise a conductive polymeric material.

3. The electro-optic assembly of claim 1, wherein the conductive spacers comprise conductive particles.

4. The electro-optic assembly of claim 1, wherein the conductive spacers comprise spacers having an outer conductive layer.

5. The electro-optic assembly of claim 1, wherein the plurality of conductive spacers comprises a mixture of ceramic and polymeric spacer beads.

6. The electro-optic assembly of claim 1, wherein the plurality of conductive spacers comprises first spacer beads and second spacer beads, the first spacer beads having a larger average radius and lower elastic modulus than the second spacer beads.

7. The electro-optic assembly of claim 1, wherein the plurality of conductive spacers comprises a substantial portion of beads having a shape selected from the group consisting of round, oval, triangular, cylindrical and cuboid shapes.

8. The electro-optic assembly of claim 1, wherein the plurality of conductive spacers comprises a substantial portion of irregularly-shaped beads.

9. The electro-optic assembly of claim 1, wherein the primary seal extends into at least one of the first and second isolation areas and the plurality of spacers are located adjacent to or outboard from the isolation areas.

10. An electro-optic assembly, comprising:
a first substantially transparent substrate comprising:
    a first surface, and
    a second surface,
        wherein the second surface comprises a first electrically conductive layer and a first isolation area separating portions of the first electrically conductive layer;
a second substrate comprising:
    a third surface, and
    a fourth surface,
        wherein the third surface comprises a second electrically conductive layer and a second isolation area;
a primary seal between the second and third surfaces, wherein the seal and the second and third surfaces define a substantially hermetic cavity; and
an electro-optic medium at least partially disposed in the cavity,
wherein the primary seal comprises a plurality of conductive spacers, the seal disposed in contact with portions of the first and second electrically conductive layers, and
further wherein the primary seal is configured such that a seal resistance between the portions of the first and second electrically conductive layers in contact with the primary seal is less than a cavity resistance through the cavity and between the portions of the first and second electrically conductive layers not in contact with the primary seal.

11. The electro-optic assembly of claim 10, wherein the conductive spacers comprise conductive particles.

12. The electro-optic assembly of claim 11, wherein the cavity further comprises an average cell spacing and the conductive particles are characterized by an average diameter that is at least $1/100$ of the average cell spacing.

13. The electro-optic assembly of claim 10, wherein the plurality of conductive spacers comprises a mixture of conductive spacers and conductive particles, and an average diameter of the conductive spacers is larger than an average diameter of the conductive particles.

14. The electro-optic assembly of claim 10, further comprising:
    a first contact in electrical contact with the first electrically conductive layer and disposed on the fourth surface; and
    a second contact in electrical contact with the second electrically conductive layer and disposed on the fourth surface,
    wherein a contact resistance between the first and second electrical contacts and along the fourth surface is greater than the seal resistance.

15. The electro-optic assembly of claim 10, wherein the conductive spacers comprise a conductive polymeric material.

16. An electro-optic assembly, comprising:
a first substantially transparent substrate comprising:
    a first surface, and
    a second surface,
        wherein the second surface comprises a first electrically conductive layer and a first isolation area separating portions of the first electrically conductive layer;
a second substrate comprising:
    a third surface, and
    a fourth surface,
        wherein the third surface comprises a second electrically conductive layer and a second isolation area;
a primary seal between the second and third surfaces, wherein the seal and the second and third surfaces define a substantially hermetic cavity; and
an electro-optic medium at least partially disposed in the cavity,
wherein the primary seal comprises a plurality of conductive particles, the seal disposed in contact with portions of the first and second electrically conductive layers, and
further wherein the conductive particles comprise magnetic material.

17. The electro-optic assembly of claim 16, wherein the magnetic material is a ferromagnetic material.

18. The electro-optic assembly of claim 16, wherein the conductive particles comprise a core of magnetic material and a conductive coating.

19. The electro-optic assembly of claim 16, wherein the conductive particles are substantially aligned in a direction normal to the portions of the first and second electrically conductive layers in contact with the seal.

20. The electro-optic assembly of claim 19, wherein the seal further comprises a matrix of non-conductive polymeric material.

* * * * *

UNITED STATES PATENT AND TRADEMARK OFFICE
CERTIFICATE OF CORRECTION

PATENT NO. : 9,612,500 B2
APPLICATION NO. : 14/850005
DATED : April 4, 2017
INVENTOR(S) : Tonar et al.

It is certified that error appears in the above-identified patent and that said Letters Patent is hereby corrected as shown below:

In the Claims

Column 12, Claim 12, Line 13:
"1/10of" should be – 1/10 of –

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*